Figure 1:
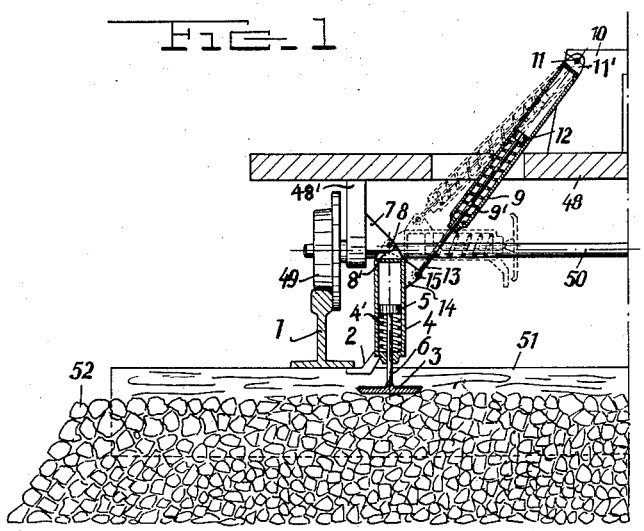

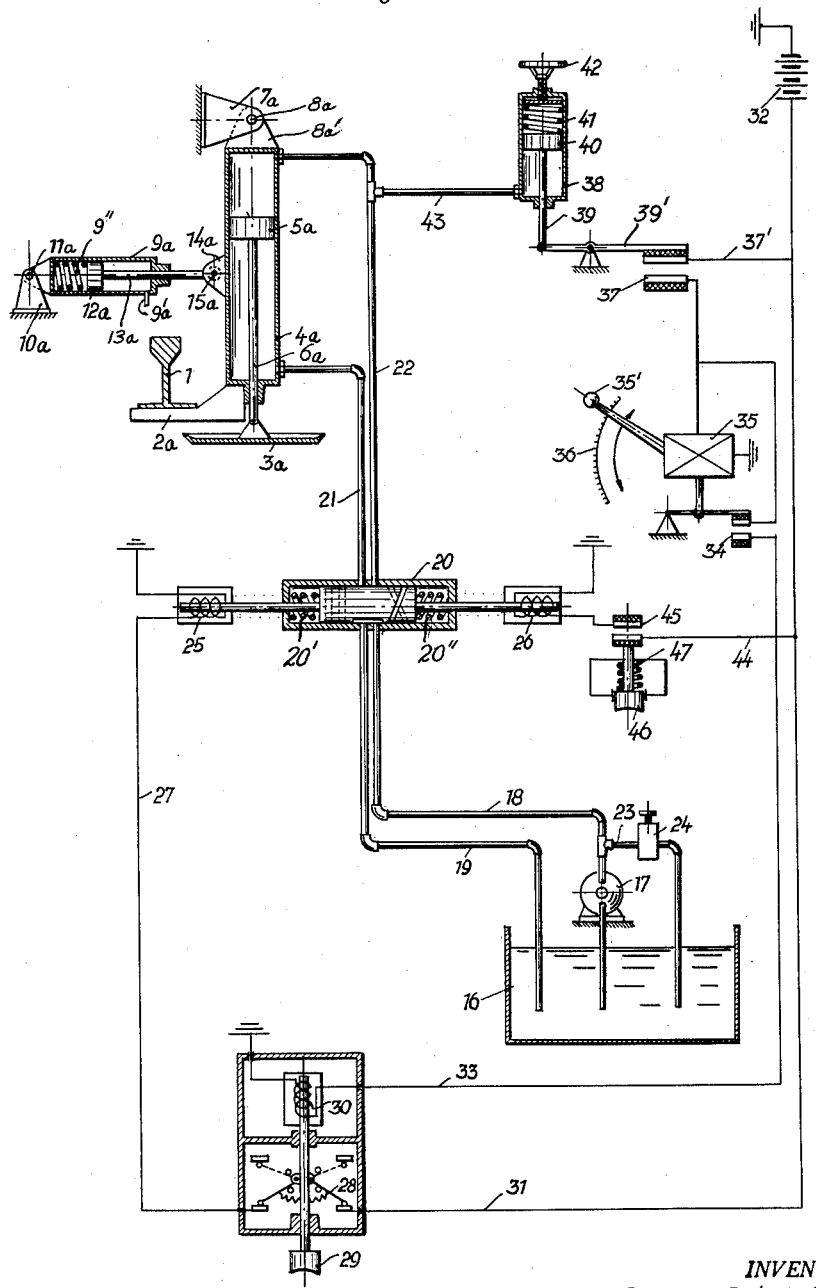
Fig. 2
INVENTOR.
FRANZ PLASSER
JOSEF THEURER
BY
AGENT

_United States Patent Office_ 3,103,182
Patented Sept. 10, 1963

3,103,182
ACTUATING AND CONTROL SYSTEM FOR A PRESSURE FLUID OPERATED TRACK DISPLACEMENT APPARATUS
Franz Plasser and Josef Theurer, both of Johannesgasse 3, Vienna, Austria
Continuation of abandoned application Ser. No. 815,979, May 26, 1959. This application Nov. 8, 1960, Ser. No. 68,042
Claims priority, application Austria May 28, 1958
5 Claims. (Cl. 104—7)

The present invention relates to a pressure fluid operated apparatus for vertically displacing a track to a predetermined position. More particularly, this invention relates to an automatic actuating and control system for operating the apparatus.

Apparatus mounted on a car movable over a track and adapted to move a track section into a desired position is known. The desired position is first determined by a surveying team or a single surveyor and the apparatus is then operated, for instance by pressure fluid means, to move the track section to the predetermined position.

It is the primary object of the invention to control the operation of the apparatus automatically so that the attention of the operator is not required for this purpose.

If such an automatic actuating and control system is used for a track lifting apparatus mounted on a mobile track tamper, the track section may be lifted to the desired level and fixed at such level by tamping ballast under the adjacent tie, thus adding a further step in the recently developed automation of railroad track maintenance. Obviously, the efficiency of such modern railway maintenance machines will be increased considerably if the obtention of the desired lifting stroke requires no special attention but is automatically controlled.

In accordance with our invention, the stroke of a pressure fluid operated track displacing apparatus is controlled by the pressure in the fluid supply line to the apparatus, the sudden pressure increase at the inception of the track displacement stroke initiating means for controlling the continued pressure fluid supply to the apparatus.

According to a preferred embodiment of the invention, control means for the supply of the pressure fluid is electrically actuated, the electric actuating circuit being closed in response to a predetermined pressure in the pressure fluid supply line and preferably including automatic means for controlling the continued flow of pressure fluid to the apparatus. The inception of the track displacement stroke is always accompanied by the sudden increase in fluid pressure since added force is necessarily needed to move the track.

In principle, therefore, the invention makes use of this clearly set moment of inception of the displacement stroke, which causes a sudden pressure rise, to control the extent of the stroke. This may obviously be done by various control means, such as, for instance, the regulation of pressure fluid supply to the track displacement apparatus. In a preferred embodiment, an adjustable time-delay relay is connected in the electric actuating circuit, the relay being energized in response to the sudden rise in pressure at the inception of the track displacement stroke and, after the set time delay, opening the actuating circuit to discontinue further pressure fluid supply to the apparatus.

The time-delay relay may be empirically adjusted or a suitable time or displacement distance scale may be provided for setting the relay. In such a case, the operator need only set the relay according to the desired displacement stroke, i.e. the vertical positioning determined by the surveyor, and the displacement stroke will be actuated and controlled entirely automatically and entirely independently from the height of the roadbed upon which a portion of the track displacement apparatus bears.

The control system of the present invention makes it possible to make use of known means of automation to increase its efficiency even further. For instance, the track position may have been determined beforehand graphically or by a punch card system by an advance surveying car. The results of these measurements may then be fed, for instance from suitable punch cards, to the control system of the present invention by devices well known in the art of automation, the track displacement apparatus with its actuating and control system being mounted on a car which follows the advance car.

If a time-delay relay is used, for instance, to control the track displacement stroke, it may be adjusted by a known control device responsive to information stored in punch cards so that this operation, too, is automatically performed without an operator's intervention, the punch card automatically setting the relay adjustment means. A pressure fluid supply control means may be regulated in the same manner as the time-delay relay.

Obviously, the punch cards produced by the advanced surveying car may also be used automatically to halt the track positioning car at the desired track section so that the original surveying results may be used to control the correction of any track section fully automatically.

The above and other objects, advantages and features of the present invention will appear more fully from the following detailed description of certain specific embodiments thereof, provided merely for purposes of illustration and without in any way limiting the scope of the invention. In the accompanying drawing, FIG. 1 is a sectional front view of a track lifting apparatus; and FIG. 2 is a schematic view of a control system according to the invention for track lifting apparatus of the general type illustrated in FIG. 1.

Referring now to the drawing, FIG. 1 illustrates one embodiment of a track lifting apparatus which may be operated by the control system of the present invention. As shown, ballast 52 constitutes the roadbed for a railroad track consisting of ties 51 and rails 1. A car frame 48 is adapted to run on the track on wheels 49 which are mounted on axle 50 journaled in webs 48'. Each web 48' carries a track lifting apparatus which may be laterally pivoted between an operative and a rest position removed from the track. The lifting apparatus includes a pressure fluid operated jacking means comprising a cylinder 4 carrying at its lower end a laterally extending rail lift member 2 fixedly attached to the lift cylinder and adapted to subtend and support rail 1 when the jacking means is in the operative position illustrated in full lines in FIG. 1. Lift cylinder 4 has an upwardly extending lug 8' to support the cylinder pivotally on bracket 7 which extends laterally inwardly from web 48'. In this manner, the lift cylinder is pivotal about fulcrum 8 in a vertical plane transverse to the direction of the track, the pivoting axis of the jacking means being substantially parallel to the track.

Piston 5 with its piston rod 6 is slidably guided in lift cylinder 4, the outer end of the piston rod extending downwardly from the lift cylinder and carrying a foot piece 3 which engages and bears upon ballast 52 in the operative position of the jacking means. Spiral compression spring 4' is mounted in the lower cylinder chamber to bias the piston 5 upwardly. A conduit (not shown) is connected to the upper lift cylinder chamber to supply pressure fluid, such as a hydraulic liquid, to the upper cylinder chamber whereby the piston may be forced downwardly against the spring bias. The pressure fluid supply and control system for the operation of the jacking means is shown in FIG. 2 and will be described in connection therewith.

The jacking means 2, 3, 4, 5 is laterally pivotal out of the range of the track to enable the car to move from track tie to track tie without interference from the jacking means. One such pivoting means is shown in FIG. 1 and will be described hereinbelow.

The pivoting means includes a cylinder 9 slidably supporting a piston 12 with its piston rod 13. A conduit (not shown) supplies pressure fluid, such as a hydraulic liquid or compressed air, to one chamber of the cylinder 9 while the opposite chamber houses spiral compression spring 9' to bias the piston inwardly. The outer end of the piston rod 13 is linked to a laterally extending lug 15 of lift cylinder 4. Similarly to lift cylinder 4, cylinder 9 also has an axially extending lug 11' pivoted at 11 to support 10 which is fixedly mounted on car frame 48. In this manner, the pivoting cylinder 9 is able to follow the pivoting movement of lift cylinder 4 when the pivoting means is in operation, the rest position of the jacking means with the corresponding position of the pivoting means being indicated in FIG. 1 in broken lines.

As will be obvious from the above description of the track lifting apparatus, supply of pressure fluid to the upper cylinder chamber of lift cylinder 4 will press foot piece 3 against the roadbed when the jacking means is in operative position. Since the rail lift member 2 subtends the rail 1 in this position of the jacking means, it will support and lift the rail as the lift cylinder moves upwardly under the pressure of the continuing pressure fluid supply. After the track has thus been lifted to and positioned at the desired level, the pressure fluid is removed from the lift cylinder as well as from pivoting cylinder 9. This will cause spring 4' to move foot piece 3 out of engagement with ballast 52 while compression spring 9' will cause the inward movement of piston rod 13 and the concomitant lateral pivoting of cylinder 4 about fulcrum 8 into the rest position illustrated in broken lines.

A specific embodiment of the control system for supplying pressure fluid, such as a hydraulic liquid, to the track lifting cylinder is illustrated schematically in FIG. 2. In principle, the track displacement apparatus partially shown in FIG. 2 is similar to the track lifting apparatus of FIG. 1, the specific track lifting structure shown in FIG. 2 being described more completely in our co-pending application No. 815,982, filed May 26, 1959.

Basically, the track lifting apparatus of FIG. 2 differs from that of FIG. 1 only by being pivotal outwardly of rail 1 instead of inwardly thereof. Corresponding to the cylinder 4 and lift member 2 in the embodiment of FIG. 1, the pressure fluid operated jacking means of FIG. 2 includes a cylinder 4a carrying at its lower end a laterally extending rail lift member constituted by a platform 2a fixedly attached to the lift cylinder and adapted to subtend and support rail 1 when the jacking means is in the illustrated operative position. Lift cylinder 4a has an upwardly extending lug 8a' to support the cylinder pivotally on bracket 7a which extends laterally outwardly from a car frame (not shown in detail). In this manner, the lift cylinder is pivotal about fulcrum 8a in a vertical plane transverse to the direction of the track, the pivoting axis of the jacking means being substantially parallel to the track.

Piston 5a with its piston rod 6a is slidably guided in lift cylinder 4a, the outer end of the piston rod extending downwardly from the lift cylinder and carrying a foot piece 3a which engages and bears upon the roadbed ballast (not shown) in the operative position of the jacking means. Conduits 21 and 22 are connected to respective ones of the cylinder chambers to supply pressure fluid, such as a hydraulic liquid, to the cylinder to move piston 5a in either direction. The pressure fluid supply and control system for the operation of the jacking means will be described hereinafter.

As in the embodiment of FIG. 1, the jacking means is laterally pivotal out of the range of the track. The pivoting means includes a cylinder 9a slidably supporting a piston 12a with its piston rod 13a. Conduit 9a' supplies pressure fluid, such as a hydraulic liquid or compressed air, to one chamber of the cylinder 9a while the opposite chamber houses spiral compression spring 9'' to bias the piston outwardly. The outer end of piston rod 13a is linked to a laterally extending lug 14a of lift cylinder 4a at pivot 15a.

Similarly to lift cylinder 4a, cylinder 9a also has an axially extending lug 11a pivoted to bracket 10a which is fixedly mounted on the car frame. In this manner, the pivoting cylinder 9a is able to follow the pivoting movement of lift cylinder 4a when the pivoting means is in operation. The operation of this track lifting apparatus is substantially identical with that of FIG. 1.

As shown in FIG. 2, the control and actuating means for the track displacement apparatus includes a storage tank holding a supply 16 of hydraulic liquid, for instance oil, constant delivery pump 17 delivering hydraulic liquid into conduit 18 at a uniform rate while conduit 19 serves as a return conduit leading back into the storage tank. An electromagnetically controlled slide valve 20 regulates the supply of hydraulic liquid to respective chambers of track moving cylinder 4a. In one position of the slide valve, conduit 18 is closed off from conduits 21 and 22 leading to the cylinder chambers and the hydraulic liquid flows back through return conduit 19. In other alternate positions of the valve, conduit 18 is connected either with supply conduits 21 or 22.

An auxiliary return conduit 23 branches off conduit 18 and is provided with an adjustable relief valve 24 to protect the entire hydraulic system against excessive pressure and to limit the maximal displacement stroke of track moving cylinder 4a.

Slide valve 20 is normally centered by a pair of springs 20', 20'', the center position of the valve corresponding to the rest position of cylinder 4a seen in FIG. 2, in which both liquid supply conduits 21 and 22 are shut off from conduit 18. The pair of electromagnets 25, 26 serve to move the slide valve into the respective supply positions for conduits 21 and 22. Magnet 25 receives its power from electric conductor 27 which forms part of an electric circuit including quick-action or snap switch 28 actuatable by push button 29. A power source 32, such as an electric storage battery, supplies current to the switch by means of electric conductor 31.

Switch 28 is also actuatable by electromagnet 30 which receives its power from electric conductor 33. The power supply in conductor 33 is controlled by switch 34 which is actuated by an adjustable time-delay relay 35. The desired time delay of relay 35 may be set by moving a pointer 35' on a scale 36. Instead of indicating the desired time delay or the desired time for actuating the track displacement apparatus, scale 36 may be calibrated to show directly the desired displacement distance. The latter calibration will considerably facilitate the required reading by the operator.

Time-delay relay 35 receives current from power source 32 by means of electric conductor 37', in which there is provided switch 37. Switch 37 is operated by the pressure in supply conduit 22 in the following manner:

A branch line 43 leads from supply conduit 22 to one chamber of cylinder 38 which slidably supports piston 40 with its associated piston rod 39. The outer end of the piston rod, which extends from cylinder 38, is linked to one end of a two-armed lever 39' whose other end carries one element of switch 37. Movement of piston rod 39 accordingly moves the lever 39' about its fulcrum and thus opens or closes switch 37. A compression spring 41 is mounted in the other chamber of cylinder 38 and normally biases piston 40 downwardly so as to keep switch 37 in the illustrated open position. The bias of spring 41 may be adjusted by turning hand wheel 42. When the pressure emanating from conduit 22 and transmitted into the lower chamber of cylinder 38 through line 43 surpasses the bias of spring 41, the piston 40 moves upwardly and thus causes the switch 37 to be closed.

Finally, electromagnet 26 receives power from battery 32 by a branch line 44 extending from conductor 31. Switch 45 in conductor 44 may be actuated by push button 46 which is normally held in a dead position by compression spring 47.

The control and actuating system for a track displacement apparatus, as illustrated in FIG. 2, operates as follows:

After the car carrying the track displacement cylinder 4a has been moved to the track section which is to be moved and the cylinder has been pivoted into the illustrated operative position by the piston 12a in the manner described above in connection with FIG. 1, push button 29 is pressed to actuate snap switch 28. This closes the connection between trunk line 31 and conductor 27 so that electromagnet 25 is energized and pushes the slide valve 20 toward the right as viewed in FIG. 2 into a position in which conduit 18 is connected with conduit 22, and return conduit 19 with conduit 21 whereby pump 17 delivers hydraulic liquid from supply 16 into the upper chamber of cylinder 4a. This causes the piston 5a to be depressed, i.e. to be moved relatively to the track engaging means 2a from one position in which the road engaging means 3a is spaced from the roadbed to another position wherein the foot piece 3a is in engagement with the roadbed ballast and then, upon further supply of pressure fluid, begins to move cylinder 4a with its rail lifting member 2a upwardly to lift the track, the actual lifting stroke against the resistance of the track causing a considerable pressure increase in the hydraulic liquid supply conduits.

The sudden increase in pressure in conduit 22 at the moment the actual lifting operation begins causes a corresponding increase of pressure in the lower chamber of cylinder 38, thereby moving piston 40 upwardly against the bias of spring 41. Thus, this pressure responsive actuating means closes switch 37. Closing of switch 37 generates a signal which causes energization of the electrically operated time-delay relay 35 and its set adjustment according to the position of pointer 35' on the scale 36 controls the time during which hydraulic liquid flows at the fixed output rate of pump 17 through conduit 22, and, accordingly, the length of the track moving stroke of cylinder 4a. As soon as the set period of time-delay relay 35 has expired and rail 1 has been moved the desired distance, the relay closes switch 34, thereby energizing electromagnet 30. Upon energization, electromagnet 30 opens switch 28 to de-energize electromagnet 25 and permit slide valve 20 to return to its spring-controlled rest position which cuts off conduits 21 and 22 from conduits 19 and 18 so that no further liquid is supplied to cylinder 4a. Pump 17 then merely circulates the pressure fluid through conduit 18 and back to supply 16 through return conduit 19. The pressure in conduit 22 remains unchanged so that the cylinder 4a maintains the rail in the desired position.

After the rail has been fixed in position, for instance by tamping ballast under a tie supporting the rail, switch 45 is operated by pushing button 46. This may be done manually by an operator or automatically in response to a set automation cycle well known per se and forming no part of the present invention. Closing of switch 45 causes the electromagnet 26 to be energized and to move slide valve 20 toward the left as viewed in FIG. 2, into a position wherein conduit 18 is connected with conduit 21 whereby pressure fluid is supplied to the lower chamber of cylinder 4a. This will cause raising of foot piece 3a from engagement with the roadbed and as soon as the foot piece is high enough to permit lateral pivoting of the jacking means out of the range of the track, push button 46 may be released again to de-energize magnet 26 and to permit slide valve 20 to return to the illustrated center position. The jacking means may now be pivoted away from the track to permit the car to move on to a subsequent track section to be displaced.

While the track displacement apparatus actuating and control system has been described in connection with a specific embodiment, it will be obvious to the skilled in the art that many variations and modifications are possible without departing from the spirit and scope of the invention as defined in the appended claims.

This is a continuation of our application Serial No. 815,979, filed May 26, 1959, now abandoned.

What we claim is:

1. In a pressure fluid operated track displacement apparatus, comprising a pressure fluid, cylinder means including a cylinder and a piston with an associated piston rod slidably supported in said cylinder, a track engaging means connected with said cylinder means, and a pressure fluid conduit arranged to supply pressure fluid to the cylinder for moving the cylinder means through a track displacement stroke: an actuating and control system for the pressure fluid supply, said system comprising a valve means in said pressure fluid conduit, said valve means having an open and a normally closed position, an electric control circuit, a power source delivering electric current to said circuit, means for holding the valve means in the normally closed position, electro-magnetic means connected in said circuit and energizable by the current for moving the valve means from said normally closed into the open position, first switch means in the circuit, said switch means being actuatable to close the circuit for energization of the electro-magnetic means, energization of the electromagnet means bringing the valve means into the open position whereby pressure fluid is supplied to the cylinder, actuating means responsive to the sudden pressure increase caused in the pressure fluid conduit by the inception of the track displacement stroke, a second switch means in said circuit, said second switch means being normally open and being closable by said pressure increase responsive means upon the said sudden pressure increase, an adjustable time-delay relay in said circuit, said relay being energized upon closing of the second switch means, a third switch means in the circuit, said third switch means being normally open and being closable by said time-delay relay, means for adjusting the relay to a desired time lag, and means for opening the first switch means, said switch opening means being connected in the circuit and being operated when said third switch means is closed by the time-delay relay, opening of the first switch means causing de-energization of the electro-magnetic means and return of the valve means into the normally closed position.

2. The actuating and control system for the pressure fluid supply for a pressure fluid operated track displacement apparatus according to claim 1, wherein said pressure fluid conduit comprises a first branch link delivering pressure fluid into a first chamber of said cylinder for effectuating said track displacement stroke and a second branch line for delivering pressure fluid into a second chamber of said cylinder for moving the cylinder means in a direction opposite to said stroke, said valve means being movable into a second open position for supplying pressure fluid into said second cylinder chamber, second electro-magnetic means in said control circuit for moving the valve means into said second open position, and fourth switch means in said circuit, said fourth switch means being normally open and means for closing said fourth switch means to energize the second electro-magnetic means.

3. In combination with a pressure fluid operated track lifting apparatus for lifting a track off a roadbed, said apparatus being mounted on a car movable on the track and comprising a source of pressure fluid, a cylinder mounted on the car, a piston slidably arranged in said cylinder for movement relative to the track, a track engaging means fixedly connected to the cylinder for engagement with the track, a roadbed engaging means fixedly connected to the piston for movement relative to the track engaging means from one position wherein the roadbed engaging means is spaced from the roadbed to another position wherein the roadbed engaging means is in engagement with the roadbed upon the relative movement of the piston, and a conduit arranged to supply pressure fluid from the pressure fluid source to the cylinder for actuation of the relative movement of the piston, the pressure of the fluid in said conduit increasing upon engagement of the roadbed engaging means with the roadbed: an actuating and control system for the pressure fluid supply, said system including an actuating means responsive to the increased pressure in the conduit prevalent upon engagement of the roadbed engaging means with the roadbed, and a pressure fluid supply control means actuated by the pressure-responsive actuating means for delimiting the pressure fluid actuation of the relative movement of the roadbed engaging means in respect of the track engaging means.

4. In the combination set forth in claim 3, said source of pressure fluid including a pump having a substantially uniform rate of delivery of said fluid, and said control means including timing means for limiting said fluid supply to said cylinder.

5. In the combination set forth in claim 4, said control means including valve means in said conduit, said timing means being arranged to close the valve means.

References Cited in the file of this patent
UNITED STATES PATENTS

| | | |
|---|---|---|
| 2,465,758 | Sedgwick et al. | Mar. 29, 1949 |
| 2,499,072 | McClure | Feb. 28, 1950 |
| 2,674,231 | Erickson | Apr. 6, 1954 |
| 2,685,794 | Hall et al. | Aug. 10, 1954 |
| 2,736,268 | Yohe | Feb. 28, 1956 |
| 2,762,313 | Sublett | Sept. 11, 1956 |
| 2,789,541 | Gaspar et al. | Apr. 23, 1957 |
| 2,985,147 | Rockwell | May 23, 1961 |
| 2,990,786 | Kershaw | July 4, 1961 |
| 3,020,705 | Hill | Feb. 13, 1962 |
| 3,044,266 | Svenson | July 17, 1962 |